US010749154B2

(12) United States Patent
Lee et al.

(10) Patent No.: US 10,749,154 B2
(45) Date of Patent: Aug. 18, 2020

(54) BATTERY PACK COMPRISING GASKET COMPRESSION LIMITER (71) Applicant: LG Chem, Ltd., Seoul (KR)

(72) Inventors: Yoon Hee Lee, Daejeon (KR); Min Sung Kim, Daejeon (KR); Jun Hee Jung, Daejeon (KR)

(73) Assignee: LG Chem, Ltd. (KR)

( * ) Notice: Subject to any disclaimer, the term of this patent is extended or adjusted under 35 U.S.C. 154(b) by 78 days.

(21) Appl. No.: 16/083,316

(22) PCT Filed: Nov. 2, 2017

(86) PCT No.: PCT/KR2017/012309
§ 371 (c)(1),
(2) Date: Sep. 7, 2018

(87) PCT Pub. No.: WO2018/097500
PCT Pub. Date: May 31, 2018

(65) Prior Publication Data
US 2019/0103590 A1 Apr. 4, 2019

(30) Foreign Application Priority Data

Nov. 22, 2016 (KR) .................. 10-2016-0155860

(51) Int. Cl.
H01M 2/08 (2006.01)
H01M 2/10 (2006.01)
(Continued)

(52) U.S. Cl.
CPC ............ H01M 2/08 (2013.01); H01M 2/024 (2013.01); H01M 2/0434 (2013.01); H01M 2/06 (2013.01);
(Continued)

(58) Field of Classification Search
CPC ................ H01M 2/08; H01M 2/024
See application file for complete search history.

(56) References Cited

U.S. PATENT DOCUMENTS

2004/0100039 A1* 5/2004 Groh ...................... F16J 15/061
277/628
2009/0236162 A1 9/2009 Takasaki et al.
(Continued)

FOREIGN PATENT DOCUMENTS

JP 2009087645 4/2009
JP 2011100619 A 5/2011
(Continued)

OTHER PUBLICATIONS

Extended European Search Report and Written Opinion for EP Application No. 17873089.1, dated Dec. 17, 2018.
(Continued)

*Primary Examiner* — Olatunji A Godo
(74) *Attorney, Agent, or Firm* — Lerner, David, Littenberg, Krumholz & Mentlik, LLP (57) ABSTRACT The present invention provides a battery pack including: a battery module assembly including a plurality of battery cells; a tray assembly having an upper surface on which the battery module assembly is mounted; a cover member having an outer periphery coupled to face an outer periphery of the tray assembly while the battery module assembly is accommodated therein; and a sealing gasket interposed between the mutually facing outer peripheries of the tray assembly and the cover member.

13 Claims, 4 Drawing Sheets (51) Int. Cl.
*H01M 2/02* (2006.01)
*H01M 2/04* (2006.01)
*H01M 2/06* (2006.01)

(52) U.S. Cl.
CPC ........... *H01M 2/10* (2013.01); *H01M 2/1072* (2013.01); *H01M 2/1077* (2013.01); *H01M 2/1083* (2013.01); *H01M 2/1094* (2013.01); *H01M 2220/20* (2013.01)

(56) References Cited

U.S. PATENT DOCUMENTS

2010/0136402 A1* 6/2010 Hermann ............ H01M 2/1077
429/120
2011/0294001 A1 12/2011 Byun et al.
2017/0012261 A1 1/2017 Chujo et al.

FOREIGN PATENT DOCUMENTS

| | | | |
|---|---|---|---|
| JP | 2014175123 | A | 9/2014 |
| JP | 2015156302 | A | 8/2015 |
| JP | 2016119155 | A | 6/2016 |
| KR | 20150086680 | A | 7/2015 |
| KR | 20160048350 | A | 5/2016 |
| KR | 20160058440 | A | 5/2016 |

OTHER PUBLICATIONS

Search report from International Application No. PCT/KR2017/012309, dated Feb. 5, 2018.

* cited by examiner

BATTERY PACK COMPRISING GASKET COMPRESSION LIMITER

CROSS-REFERENCE TO RELATED APPLICATIONS

The present application is a national phase entry under 35 U.S.C. § 371 of International Application No. PCT/KR2017/012309, filed on Nov. 2, 2017, published in Korean, which claims priority from Korean Patent Application No. 10-2016-0155860, filed on Nov. 22, 2016, the disclosures of which are hereby incorporated herein by reference.

TECHNICAL FIELD

The present invention relates to a battery pack having a gasket compression limiter.

BACKGROUND ART

In line with an increase in the price of energy sources due to the depletion of fossil fuels and amplification of interests in environmental pollution, environmentally-friendly alternative energy sources have become an indispensable factor for the future life. Accordingly, research has been continued on various power production technologies, such as atomic energy, solar energy, wind energy, tidal energy, and power storage devices for more efficiently using energy produced as such have also continuously drawn interests.

In particular, as the technological development and demand for mobile apparatuses increase, the demand for batteries as an energy source rapidly has increased, and recently, applications of secondary batteries as power sources for electric vehicles (EV), hybrid electric vehicles (HEV), and the like have been realized, and application fields have been expanded to an auxiliary power source and the like through gridding, and thus, various research on batteries capable of meeting various demands are being carried out.

Meanwhile, while one, two, three, or four battery cells are used for one device in small-size mobile apparatuses, a battery pack including a medium and large-size battery module in which a plurality of battery cells are electrically connected is used for medium and large-size devices such as vehicles.

In the case of such a battery pack, devices exposed to various operation environments such as electric bicycles, electric vehicles have components which constitute a battery pack and which should be safely protected against external environment, and a high output and a large capacity should be achieved by using a plurality of batteries. Therefore, safety aspects have also acquired greater importance.

Representatively, moisture or foreign substances may easily penetrate into a battery pack in a high humidity condition, such as the rainy season, and in various environments, and may therefore deteriorate the safety of the battery pack such that a malfunction of a battery pack module constituting the battery pack or an electrical connection device is caused thereby.

Accordingly, in the case of a general battery pack, the above limitations have been solved by interposing gaskets in coupling portions of case members constituting the battery pack.

However, gaskets are generally made of materials with predetermined elasticity so as to exert desired sealing capability due to coupling strengths of case members, and thus portions, which deviate from desired portions and are pushed and thereby bent, may occur and therefore cause the deterioration of the coupling strengths between the case members and the safety of the battery pack.

In addition, since the gasket is formed of an elastic material and may therefore deviate from a normal position, metal bushings have been conventionally used by being inserted into fastening holes of the gasket.

However, a step of inserting metal bushings into the fastening holes of the gasket may cause not only an increase in manufacturing time but also a remarkable increase in manufacturing costs.

Thus, the development of a technique which can basically solve the above limitations is highly demanded.

DISCLOSURE OF THE INVENTION

Technical Problem

The purpose of the present invention is to solve the technical limitations which are concerning related arts, and which have been demanded from the past.

The inventors of the present invention arrive at the present invention by confirming, through repeated in-depth research and various experiments, that as will be described later: a gasket may more easily be located on a tray assembly; due to a pressure or friction applied when the tray assembly and a cover member are coupled, the phenomenon of the gasket to deviate from the coupling portion may be prevented; the water tightness of a battery pack may thereby be improved, and thus, the overall safety may be improved.

Technical Solution

In accordance with an exemplary embodiment for achieving the above-mentioned limitations, a battery pack includes: a battery module assembly including a plurality of battery cells; a tray assembly having an upper surface on which the battery module assembly is mounted; a cover member having an outer periphery coupled to face an outer periphery of the tray assembly while the battery module assembly is accommodated therein; and a sealing gasket interposed between the mutually facing outer peripheries of the tray assembly and the cover member, wherein mutually communicating fastening holes are respectively formed in the outer peripheries of the tray assembly, the outer peripheries of the cover member, and the gasket such that first fastening members are inserted thereinto; one or more second fastening members respectively coupled to the first fastening members are positioned under the fastening holes formed on the tray assembly; second fastening members include gasket compression limiters in which one ends thereof pass through the fastening holes of the tray assembly and extend to protrude toward an upper surface of the tray assembly; and the gasket compression limiters are inserted into the fastening holes of the gasket, and the diameters of the outer circumferential surfaces of the gasket compression limiters are relatively greater than the diameters of the outer circumferential surfaces of the first fastening members. Accordingly, the battery pack according to an exemplary embodiment is formed in a structure in which: the gasket compression limiters are inserted into the fastening holes of the gasket; and the diameters of the gasket compression limiters are formed relatively greater than the diameters of the first fastening members, so that the gasket may be easily located on the tray assembly by means of a gasket fastening part, a phenomenon, in which the gasket deviates from a coupling portion due to pressure or friction applied when the tray assembly and the cover member are coupled, may be prevented, and thus, the overall safety may be improved by improving water tightness of the battery pack.

In an embodiment, the inner circumferential surfaces of the fastening holes of the gasket and the gasket compression limiters may be in direct contact with each other. Accordingly, a function of maintaining compression rate of the gasket at a certain level by inserting metal bushings into the fastening holes of a gasket in a conventional gasket structure may be served by the compressing limiters of the second fastening members, and thus, the time and costs for manufacturing the battery pack may be remarkably reduced.

In a specific embodiment, the gasket compression limiters may be formed in a structure surrounding some portions on an upper surface of the gasket adjacent to an inner circumferential surface of the fastening holes of the gasket.

The gasket compression limiters may protrude from an upper surface of the tray assembly by heights of 50% to 95% with respect to a thickness of the gasket. A phenomenon in which the gasket is compressed and deformed to have a thickness of equal to or greater than 50% and less than 90% with respect to an original thickness thereof due to a pressure applied when the tray assembly and the cover member are coupled, and thus, the damage to the gasket caused by excessive compression or deformation may be prevented.

In an embodiment, the diameters of outer circumferential surfaces of the gasket compression limiters are formed in the same size as the diameters of the inner circumferential surfaces of the gasket. Accordingly, water tightness of the battery pack may be further ensured.

The second fastening members may be welded and coupled to portions corresponding to fastening holes of the tray assembly on a lower surface portion of the tray assembly.

In an embodiment, the first fastening members and second fastening members may be respectively bolts and nuts, and the second fastening members may be coupled, by means of a screw structure, to the first fastening members passing through fastening holes respectively formed in the outer peripheries of the cover member, the gasket, and the outer peripheries of the tray assembly.

In a specific embodiment, the diameters of the gasket compression limiters may be formed in sizes of 100% to 110% with respect to the diameters of outer circumferential surfaces of the first fastening members so as to support a total pressure applied from the first fastening members.

In an embodiment, a plurality of fastening protrusions may be formed on one surface of the gasket facing an upper surface of outer peripheral portion of the tray assembly, and a plurality of fastening holes for inserting and coupling the protrusions thereinto may be formed in portions corresponding to the fastening protrusions.

Specifically, end portions of the fastening protrusions may be formed in tapered structures having widths decreasing toward the upper surface of outer peripheral portion of the tray assembly.

In an embodiment, the gasket may be formed of one unit member having a ring shape.

The material of the gasket may be, but not limited to, any one or more selected from the group consisting of synthetic rubber, natural rubber, silicone, and polyvinyl chloride (PVC), and may be, but not remarkably limited to, a material exhibiting a desired sealing capability by being interposed between the outer peripheries of the tray assembly and the outer peripheries of the cover member which are coupled to face each other.

In such a case, the synthetic rubber may be one or more selected from the group consisting of styrene-butadiene rubber, polychloroprene rubber, nitrile rubber, butyl rubber, butadiene rubber, isoprene rubber, ethylenepropylene rubber, polysulfide-based rubber, silicone rubber, fluorine-based rubber, urethane rubber, and acrylic rubber.

Meanwhile, a battery pack constituting a battery pack in accordance with an exemplary embodiment may be, although the types thereof are not particularly limited, a lithium secondary battery such as a lithium ion battery or a lithium ion polymer battery which has merits of a high energy density, discharge voltage, output stability, etc., as a specific example.

In general, the lithium secondary battery includes a positive electrode, a negative electrode, a separation membrane, a lithium salt-containing non-aqueous electrolytic solution.

The positive electrode, for example, is prepared such that a mixture of a positive electrode active material, a conductive material, and a binder is applied on a positive electrode collector and dried, and if necessary, a filler may also be further added to the mixture.

The positive electrode material may be, but not limited to: a layered compound or a compound substituted by one or more transition metals such as lithium cobalt oxide ($LiCoO_2$), a lithium nickel oxide ($LiNiO_2$); a lithium manganese oxide of chemical formula $Li_1+xMn_2-xO_4$ (where, x is 0-0.33), such as $LiMnO_3$, $LiMn_2O_3$, $LiMnO_2$; a lithium copper oxide ($Li_2CuO_2$); a vanadium oxide such as $LiV_3O_8$, $LiFe_3O_4$, $V_2O_5$, $Cu_2V_2O_7$; an Ni site-type lithium nickel oxide represented by a formula $LiNi_{1-x}M_xO_2$ (where, M=Co, Mn, Al, Cu, Fe, Mg, B or Ga, and x=0.01-0.3); a lithium manganese composite oxide represented by a formula $LiMn_2-xM_xO_2$ (where, M=Co, Ni, Fe, Cr, Zn or Ta, and x=0.01-0.1) or $Li_2Mn_3MO_8$ (where, M=Fe, Co, Ni, Cu or Zn); $LiMn_2O_4$ in which some Li in the formula is substituted by an alkali earth metal ion; a disulfide compound; $Fe_2(MoO_4)_3$; or the like.

The conductive material, in general, is added in 1-30 wt % with respect to the total weight of the mixture containing the positive active material. Such a conductive material may be, but not particularly limited to, a material having conductivity without causing a chemical change in the battery, for example, a graphite such as natural graphite or artificial graphite; a carbon black such as carbon black, acetylene black, Ketjen black, channel black, furnace black, lamp black, or summer black; a conductive fiber such as carbon fiber or metal fiber; metal powder such as fluorocarbon, aluminum powder, or nickel powder; a conductive whisky such as zinc oxide or potassium titanate; a conductive metal oxide such as titan oxide; a polyphenylene derivative; or the like.

The binder is a component assisting the bonding of the active material, the conductive material, and the like and the bonding with respect to the collector, and in general, is added in 1-30 wt % with respect to the total weight of the mixture containing the positive electrode material. Examples of such a binder may include: polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, stylene butylenes rubber, fluoro rubber, various copolymers, etc.

The filler is a component suppressing the expansion of the positive electrode, is selectively used, and may be, but not particularly limited to, a fibrous material without causing a chemical change in the battery, and for example, olefin-based polymers such as polyethylene or polypropylene or fibrous materials such as glass fiber or carbon fiber may be used.

The negative electrode is prepared such that a negative electrode active material is applied on a negative electrode collector and dried, and if necessary, components as described above may also be selectively further added.

As the negative electrode active material, for example: carbon such as non-graphitized carbon or graphite-based carbon; a metal composite oxide such as $Li_xFe_2O_3(0≤x≤1)$, $Li_xWO_2(0<x≤1)$, $Sn_xMe_{1-x}Me'_yO_z$ (Me: Man, Fe, Pub, Gee; Me': Al, B, P, Is, elements of Group I, II, and III in the periodic table, halogen; $0≤x≤1$; $1≤y≤3$; $1≤z≤8$); metallic lithium; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as oxyacetylene; Li—Co—Ni based material, or the like may be used.

The separation membrane and separating film are interposed between the positive electrode and the negative electrode, and an insulating thin film having high ionic permeability and mechanical strength is used. The diameters of pores in the separation membrane are in general 0.01-10 μm and the thicknesses thereof are in general 5-130 μm. As a material for such a separation membrane, for example, a sheet or a nonwoven fabric made from an olefin-based polymer such as chemically resistant and hydrophobic polypropylene may be used. When a solid electrolyte such as a polymer is used as an electrolyte, the solid electrolyte may also function as the separation membrane.

In addition, in a specific embodiment, to improve the safety of the battery, the separation membrane and/or the separating film may be an organic/inorganic composite porous safety-reinforcing separators (SRS).

The SRS separation membrane is manufactured by using inorganic particles and binder polymers as components of an active layer on a substrate of polyolefin-based separation membrane, and in this case, has a porous structure included in the separation membrane substrate itself and a uniform porous structure formed by using an interstitial volume between the inorganic particles which are components of the active layer.

When such an organic/inorganic composite porous separation membrane is used, there is a merit in that an increase in the thickness of a battery due to the swelling during formation may be suppressed, compared to the case in which a general separation membrane is used. In addition, when a polymer which may be gelled when impregnated in a liquid electrolyte is used as a polymer component of a binder, the polymer may be simultaneously used as an electrolyte.

In addition, the contents of inorganic particles which are components of the active layer in the separation membrane and the contents of the binder polymer are adjusted, and thus, organic/inorganic composite porous separation membrane may exhibit an excellent adhesiveness characteristic. Thus, there is a characteristic in that a battery assembly process may be easily carried out.

The inorganic particles are not particularly limited as long as they are only electrochemically admitted. That is, the inorganic particles that may be used in the present invention are not particularly limited if oxidation and/or reduction reaction does not occur within an operation voltage range (for example, 0-5 V with respect to Li/Li+) of a battery in which the particles are used. In particular, when inorganic particles having ion transfer capability are used, performance can be improved by enhancing ion conductivity in an electrochemical device. Therefore, the ion conductivity of inorganic particle is preferably as high as possible. In addition, when the inorganic particles have high density, not only the inorganic particles are difficult to disperse during coating, but also there is a problem of increase in weight when a battery is manufactured. Therefore, density of the inorganic particle is preferably as small as possible. In addition, when having high permittivity, the inorganic particles may contribute to increase the dissociation rate of electrolytic salt, such as lithium salt, and improve the ion conductivity of the electrolytic solution.

Lithium salt-containing electrolytic solution is composed of a polar inorganic electrolytic solution and lithium salt. As an electrolytic solution, a nonaqueous liquid electrolyte, an organic solid electrolyte, an inorganic solid electrolyte, or the like are used.

As the nonaqueous liquid electrolytic solution, for example, an aprotic organic solvent, such as N-methyl-2-pyrrolidinone, propylene carbonate, ethylene carbonate, butylenes carbonate, dimethyl carbonate, diethyl carbonate, gamma-butylolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like, may be used.

As the organic solid electrolyte, for example, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers containing ionic dissociation groups may be used.

As the inorganic solid electrolyte, for example, a nitride, a halide, a sulfide or the like of Li, such as $Li_3N$, $LiI$, $Li_5NI_2$, $Li_3$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, may be used. As the lithium salt, a material easily dissolved in the nonaqueous electrolyte, such as $LiCl$, $LiBr$, $LiI$, $LiClO_4$, $LiBF_4$, $LiB_{10}C_{110}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, lithium imide, may be used.

In addition, in the nonaqueous electrolyte, in order to improve charge/discharge characteristics, flame retardancy, or the like, for example, pyridine, triethylphosphite, triethanolamine, cyclic ether, ethylenediamine, n-glyme (glyme), hexamethylene phosphoric tree amide, nitro benzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride may also be added. In some cases, in order to provide incombustibility, a halogen-containing solvent such as carbon tetrachloride, ethylene trifluoride, may also be added, and carbon dioxide gas may also be added in order to further improve high-temperature storage characteristics.

In addition, the present invention provides a device including the battery pack, and the device may be any one selected from the group consisting of an electric vehicle, a hybrid electric vehicle, a plugin hybrid electric vehicle, and power storage device.

Since the above-mentioned devices are well in the art, detailed descriptions thereof will not be provided in this specification.

Advantageous Effects

As described above, the battery pack according to an exemplary embodiment is formed in a structure in which: the gasket compression limiters are inserted into the fastening holes of the gasket; and the diameters of the gasket compression limiters are formed relatively greater than the diameters of the first fastening members, so that the gasket may be easily located on the tray assembly by means of a gasket fastening part, a phenomenon, in which the gasket deviates from a coupling portion due to pressure or friction applied when the tray assembly and the cover member are coupled, may be prevented, and thus, the overall safety may be improved by improving water tightness of the battery pack.

MODE FOR CARRYING OUT THE INVENTION

Hereinafter, exemplary embodiments will be described in detail with reference to contents illustrated in accompanying drawings, but the present invention should not be construed as limited to the exemplary embodiments.

Figure 1:
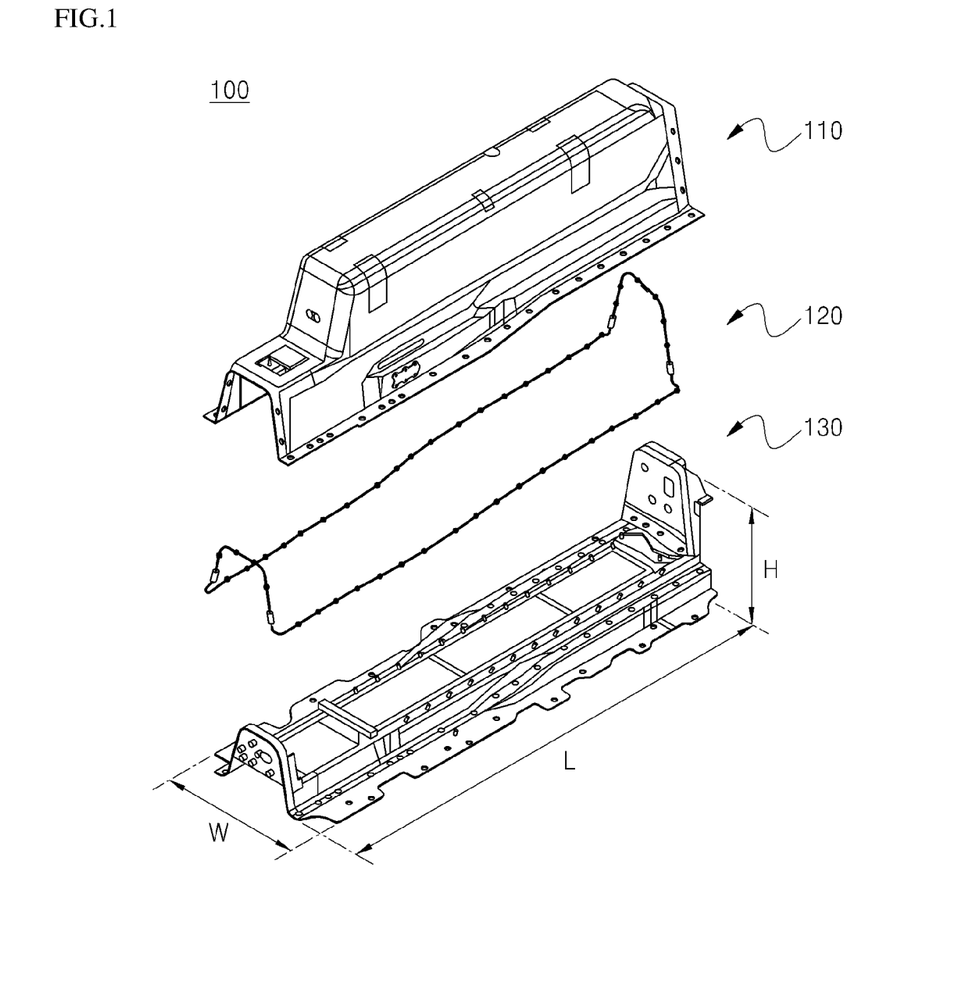
FIG. 1 is a schematic view illustrating components of a battery pack in accordance with an exemplary embodiment

FIG. 1 shows a schematic view illustrating components of a battery pack in accordance with an exemplary embodiment.

Referring to FIG. 1, a battery pack 100 includes: a tray assembly 130 having an upper surface on which a battery module assembly (not shown) is mounted; a cover member 110 having an outer periphery coupled to face an outer periphery of the tray assembly 130 while the battery module assembly is accommodated in the cover member 110; and a sealing gasket 120 interposed between the mutually facing outer peripheries of the tray assembly 130 and the cover member 110.

Since the battery pack 100 has a limited mounting spade due to vehicular components disposed with a high degree of integration, the battery module assembly constituting the battery pack 100 is formed in a rectangular parallelepiped structure having a greater height (H) relative to a width (W) and a greater length (L) relative to the height (H) so as to be mounted in a narrow space such between the driver seat and a passenger seat, and the battery pack 100 is formed in a rectangular parallelepiped structure or a tunnel-like structure.

Figure 2:
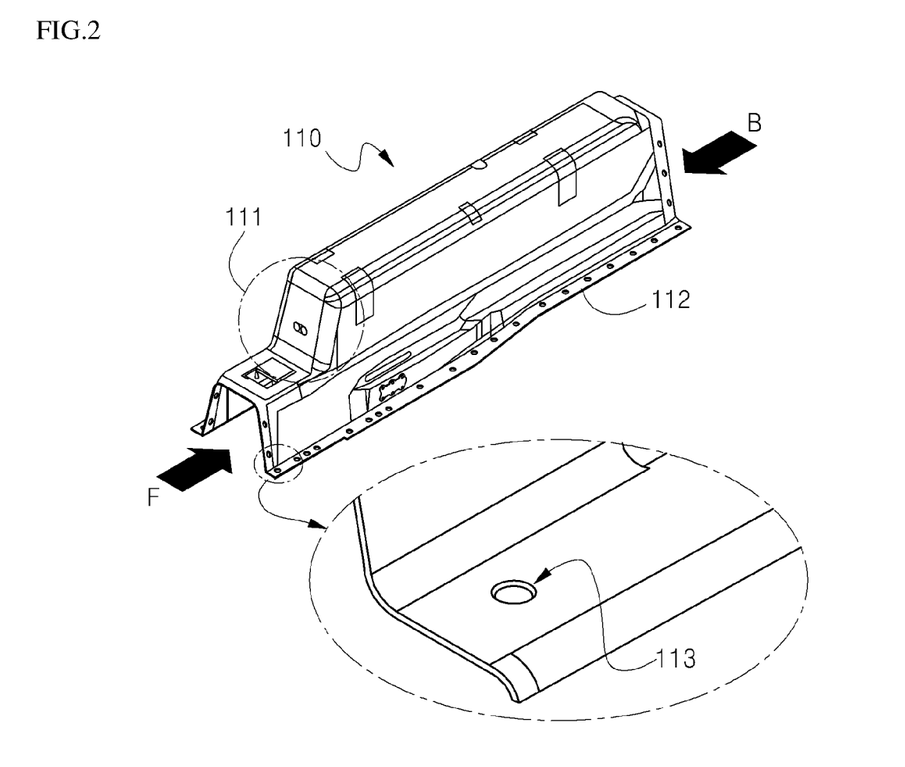
FIG. 2 is a schematic view illustrating a structure of a cover member of the battery pack of FIG. 1.
Figure 3:
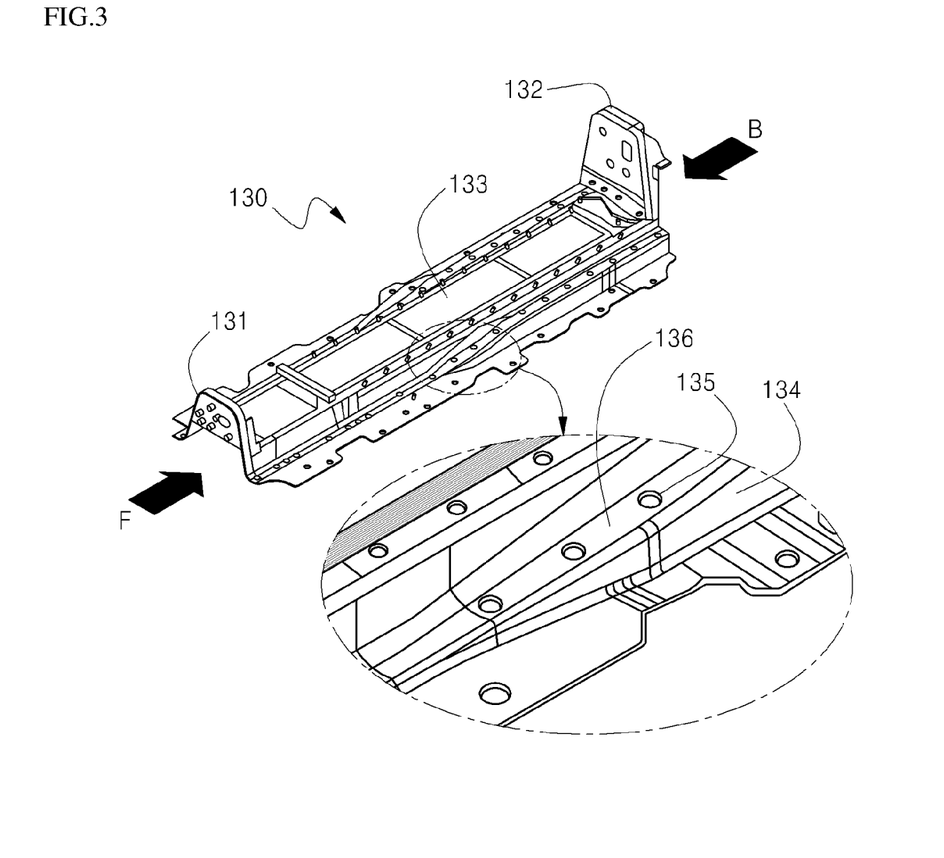
FIG. 3 is a schematic view illustrating a structure of a tray assembly of the battery pack of FIG. 1.
Figure 4:
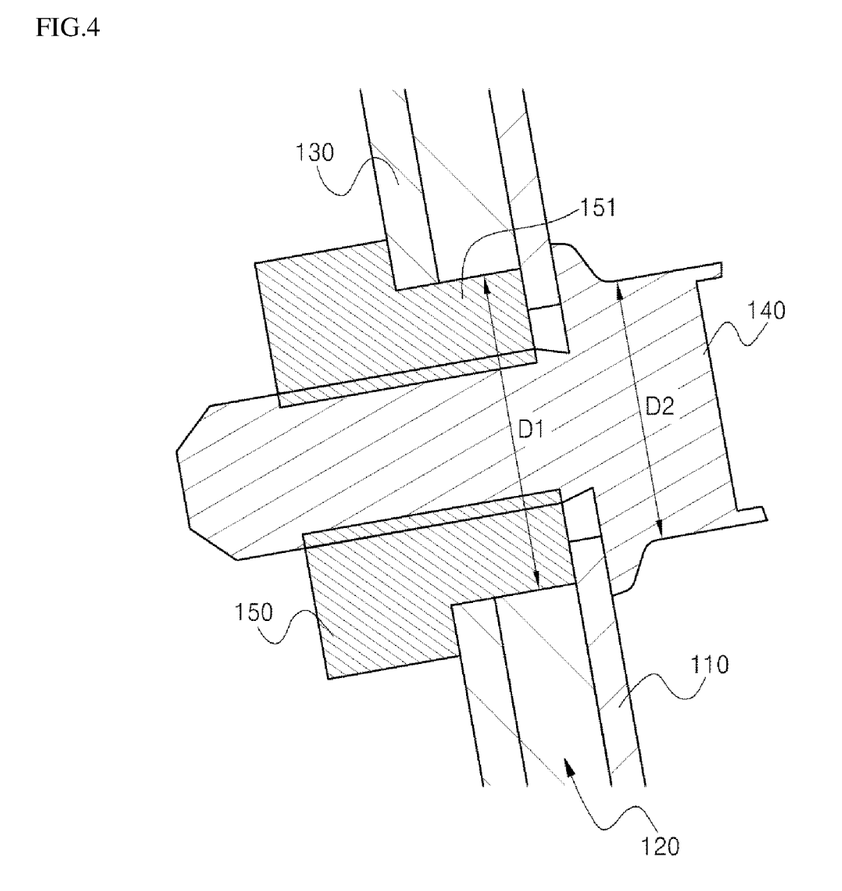
FIG. 4 is a cross-sectional view schematically illustrating a structure in which components of the battery pack of FIG. 1 are coupled by means of fastening members.

Detailed structures of respective components constituting the battery pack 100 are illustrated in FIGS. 2 to 4.

First, FIG. 2 shows a schematic view illustrating a structure of the cover member of the battery pack of FIG. 1.

Referring to FIG. 2 together with FIG. 1, the cover member 110 is formed in a tunnel-like structure corresponding to an outer peripheral shape of the tray assembly 130.

The cover member 110 has a structure in which a step 111 formed in heights on the front side F and the rear side B, the rear side B having a greater height surrounds the battery module assembly, and the front side F surrounds an operating switch part of the battery module assembly.

The cover member 110 has outer peripheries 112 which are coupled to face the tray assembly 130 to be fastened the tray assembly 130 and which are bent and extend outward, and a plurality of fastening holes 113 for inserting first fastening members thereinto are formed in the outer peripheries 113.

The fastening holes 113 have structures mutually communicating with fastening holes formed in the outer peripheries of the tray assembly 130 and the gasket 120, and the cover member 110, the tray assembly 130, and the gasket 120 may be fastened by inserting the first fastening members into the fastening holes 113.

FIG. 3 shows a schematic view roughly illustrating a structure of the tray assembly of the battery pack of FIG. 1.

Referring to FIG. 3 together with FIGS. 1 to 2, the tray assembly 130 has a front-side outer peripheral wall 131 and a rear-side outer peripheral wall 132 respectively attached onto the outer peripheries on the front-side F and the rear-side B.

Devices for electrically connecting the battery module assembly and external devices on the respective outer peripheral walls 131 and 132, and the fluctuation of the battery pack 100 due to a shock applied from the outside may also be reduced as the outer peripheries 131 and 132 are respectively coupled to the devices.

The tray assembly 130 has outer peripheries 134 which are bent and extend from a battery attachment portion 133 corresponding to the outer peripheries 112 of a cover member 110, and a plurality of fastening holes 135 mutually communicating with fastening holes 113 of the cover member 110 are formed in the outer peripheries 134.

The outer peripheries 134 of the tray assembly 130 include inclining sections 136 having heights increasing from the front side F to the rear side B corresponding to the shape of a space in which the battery pack 100 is mounted, but the structures of the inclining sections 136 are not limited thereto, and may also be formed in a structure in which heights thereof decreased from the front side F toward the rear side B according to the kind, shape, mounting space of the devices to which the battery pack 100 is applied.

FIG. 4 shows a cross-sectional view roughly illustrating a structure in which components of the battery pack of FIG. 1 are coupled by means of fastening members.

Referring to FIG. 4, the outer peripheries of the tray assembly 130 and the outer peripheries of the gasket 120 are coupled to face each other while the gasket 120 is interposed therebetween.

Mutually communicating fastening holes are respectively formed in the outer peripheries of the tray assembly 130, the gasket 120, and the outer peripheries of the cover member 110, and a second fastening members 150 respectively coupled to a first fastening members 140 are positioned on the bottom surface of the fastening holes of the tray assembly 130.

The first fastening members 140 are bolts and the second fastening members 150 are nuts.

The second fastening members 150 includes a gasket compression limiters 151 in which one end thereof passes through the fastening holes of the tray assembly 130 and extends to protrude toward an upper surface of the tray assembly 130.

The gasket compression limiters 151 are inserted into the fastening holes of the gasket 120, and the diameters D1 of the outer circumferential surfaces of the gasket compression limiters 151 are formed relatively greater than the diameters D2 of the outer circumferential surfaces of the first fastening members 140. Specifically, the diameters D1 of the outer circumferential surfaces of the gasket compression limiters 151 are formed in sizes of 110% of the diameters D2 of the outer circumferential surfaces of the first fastening members.

Inner circumferential surfaces of the fastening holes of the gasket 120 and the gasket compression limiters 151 are in direct contact with each other.

The gasket 120 has fastening protrusions (not shown) which are formed on one surface thereof facing the upper surface of the tray assembly 130, and which are inserted in the fastening holes formed in the tray assembly 130.

The fastening protrusions are formed in a tapered structure which has a width gradually decreasing from a portion adjacent to the gasket 120 toward an end portion thereof.

The first fastening members 140 passes and inserted from the upper surface of the cover member 110 through the fastening holes respectively formed in the outer cover, the gasket 120, and the outer peripheries of the tray assembly 130 and are coupled to the inner circumferential surface of the tray assembly 130 by means of a screw structure.

Those skilled in the art belonging to the present invention could carry out various application and modifications without departing from the scope of the present invention on the basis of the above descriptions.

The invention claimed is:

1. A battery pack comprising:
    a battery module assembly comprising a plurality of battery cells;
    a tray assembly having an upper surface on which the battery module assembly is mounted;
    a cover member having an outer periphery coupled to face an outer periphery of the tray assembly while the battery module assembly is accommodated therein; and
    a sealing gasket interposed between the mutually facing outer peripheries of the tray assembly and the cover member, wherein
    mutually communicating fastening holes are respectively formed in the outer periphery of the tray assembly, the outer periphery of the cover member, and the sealing gasket such that first fastening members are respectively inserted thereinto;
    second fastening members respectively coupled to the first fastening members are positioned under the respective fastening holes formed on the tray assembly;
    the second fastening members each include a gasket compression limiters in which one ends thereof passes through the respective fastening holes of the tray assembly and extends to protrude toward the upper surface of the tray assembly; and
    the gasket compression limiters are inserted into the fastening holes, respectively, of the sealing gasket, and diameters of outer circumferential surfaces of the gasket compression limiters are relatively greater than diameters of outer circumferential surfaces of the first fastening members, respectively.

2. The battery pack of claim 1, wherein inner circumferential surfaces of the fastening holes of the sealing gasket and the respective gasket compression limiters are in direct contact with each other.

3. The battery pack of claim 2, wherein the gasket compression limiters are each formed in a structure surrounding some portions of an upper surface of the sealing gasket, respectively, the upper surface of the gasket being adjacent to the inner circumferential surfaces of the fastening holes of the sealing gasket.

4. The battery pack of claim 2, wherein the gasket compression limiters protrude from the upper surface of the tray assembly by respective heights of 50% to 95% with respect to a thickness of the sealing gasket.

5. The battery pack of claim 1, wherein the diameters of the outer circumferential surfaces of the gasket compression limiters are the same as diameters of inner circumferential surfaces of the fastening holes of the sealing gasket, respectively.

6. The battery pack of claim 1, wherein the second fastening members are welded and coupled to respective portions corresponding to the fastening holes of the tray assembly on a lower surface portion of the tray assembly.

7. The battery pack of claim 1, wherein the first fastening members and second fastening members are respectively bolts and nuts, and the second fastening members are coupled to the respective first fastening members passing through the fastening holes respectively formed in the outer periphery of the cover member, the sealing gasket, and the outer periphery of the tray assembly.

8. The battery pack of claim 7, wherein the diameters of the gas compressing limiters are formed in respective sizes of 100% to 110% of the diameters of the outer circumferential surfaces of the first fastening members, respectively.

9. The battery pack of claim 1, wherein a plurality of fastening protrusions are formed on one surface of the sealing gasket facing an upper surface of an outer peripheral portion of the tray assembly, and a plurality of fastening holes for inserting and coupling the protrusions thereinto, respectively, are formed in the outer peripheral portions of the tray assembly corresponding to the fastening protrusions.

10. The battery pack of claim 9, wherein end portions of the fastening protrusions are formed in respective tapered structures each having a width decreasing toward the upper surface of the outer peripheral portion of the tray assembly.

11. The battery pack of claim 1, wherein the sealing gasket comprises a first unit member having a ring shape.

12. The battery pack of claim 1, wherein a material of the sealing gasket includes at least one of synthetic resin, natural rubber, silicone, and polyvinyl chloride (PVC).

13. A device, comprising the battery pack according to claim 1.

* * * * *